United States Patent [19]
Karper et al.

[11] 3,818,751
[45] June 25, 1974

[54] TESTING APPARATUS FOR ELASTOMERS

[75] Inventors: Paul W. Karper, Stow; John P. Porter, Cuyahoga Falls, both of Ohio

[73] Assignee: The B. F. Goodrich Company, New York, N.Y.

[22] Filed: May 23, 1972

[21] Appl. No.: 256,167

[52] U.S. Cl. .................................. 73/15.6, 73/101
[51] Int. Cl. ........................................... G01h 3/30
[58] Field of Search ................. 73/15.6, 95, 99, 101

[56] References Cited
UNITED STATES PATENTS
3,675,475  7/1972  Weinstein .............................. 73/99

OTHER PUBLICATIONS
Blackwell et al., A Modified Kê Torsional Pendulum for Stress Strain Relaxation in Journal of Scientific Instruments 1968 Series 2 Vol. 1

*Primary Examiner*—Herbert Goldstein
*Attorney, Agent, or Firm*—W. A. Shira, Jr.

[57] ABSTRACT

An apparatus for indicating, in numerical form, the stress produced in a sample of an elastomer when subjected to a deformation of predetermined magnitude, a numerical value of the length of time for the stress so produced to decrease to a predetermined percentage of the maximum, and also a numerical value of the area under the stress-time curve for a predetermined time interval inclusive of the maximum stress. The apparatus preferably includes means to bring the sample to a predetermined temperature prior to subjecting it to the predetermined deformation.

20 Claims, 8 Drawing Figures

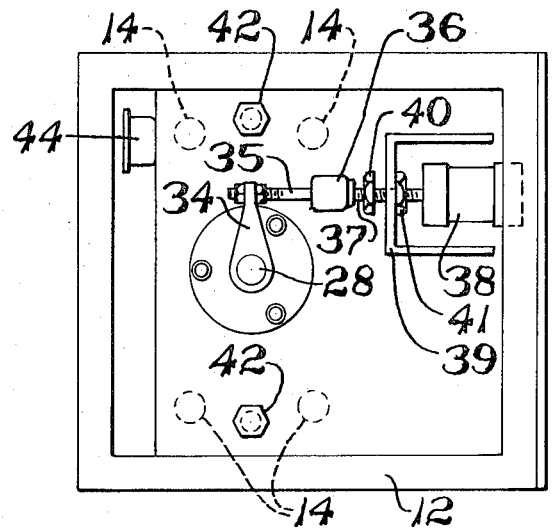
Fig. 3
Fig. 1
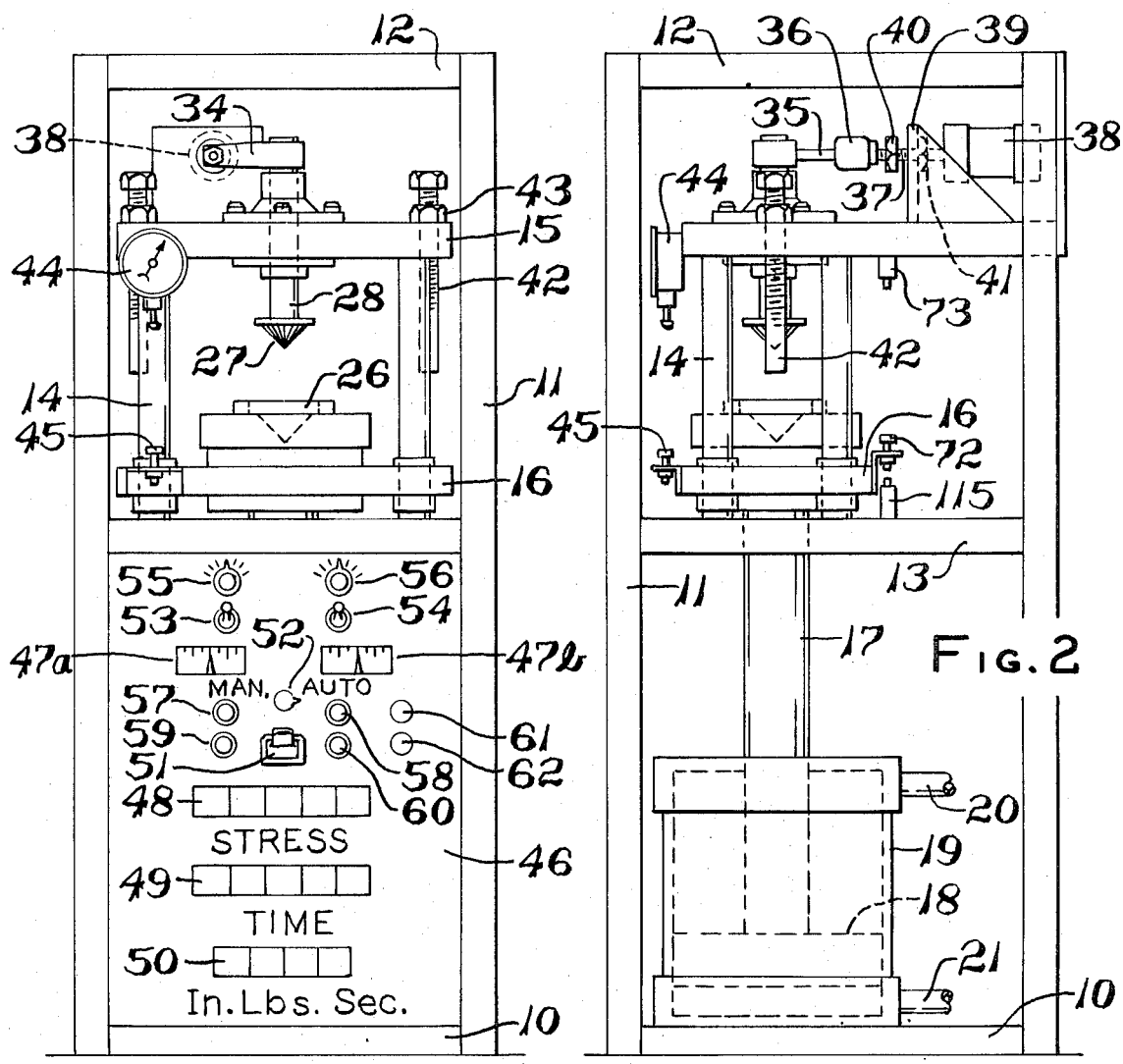
Fig. 2

TESTING APPARATUS FOR ELASTOMERS

BACKGROUND OF THE INVENTION

The manufacture of articles made of elastomers requires information with respect to the processing characteristics of the elastomers. One significant processing characteristic is the manner in which the material responds to stresses and the length of time required for the material to recover from a stress. It is now known that when a sample of elastomer is subjected to a momentary torsional deformation of predetermined amount the length of time for the resulting stress to reduce or decay to a predetermined percentage of the maximum is a good indication of the processibility of the elastomer and also is a significant characteristic of the cured elastomer. Hence, testing apparatus have heretofore been devised to subject a specimen of elastomer to such a test and to measure the results by means of a chart recorder. This provides an accurate indication of the property of the elastomer known as stress relaxation but unfortunately has not lent itself to manufacturing control since it has required the recording and interpretation of a graph for each sample tested.

SUMMARY OF THE INVENTION

The present invention provides an improved apparatus for testing the response of a sample of elastomer to a momentary predetermined torsional deformation at a preselected temperature, provides a numerical indication of the amount of the resulting stress, determines when that stress has reduced to a predetermined percentage of the maximum value, provides a numerical indication of the time interval required for the attainment of the said predetermined reduction in stress, and also a numerical value of the area under the stress-time curve for a predetermined time interval inclusive of the. This latter value, which is representative of the shape of said curve, together with the numerical value of the maximum stress provides significant information as to the processing characteristics of the elastomer.

The apparatus may, in addition, include an automatic time delay and a means to heat the specimen such that the test is not performed until a sufficient interval of time has elapsed after the sample is placed in the instrument to ensure that it is at a proper temperature. The test, when performed, is automatically, rapidly effected with a minimum of attention from the operator and the results are displayed in terms of easily read numerical values so that the apparatus readily lends itself to production control of elastomer or elastomer-containing articles.

Further and additional advantages and novel features of the improved testing apparatus will be apparent from the following detailed description of the presently preferred embodiment in conjunction with the accompanying drawings forming a part of this application.

BRIEF DESCRIPTION OF THE DRAWINGS

FIG. 1 is a front elevational view of an apparatus incorporating the presently preferred form of the invention;

FIG. 2 is a side elevational view of the apparatus illustrated in FIG. 1;

FIG. 3 is a top plan view of the apparatus shown in FIGS. 1 and 2;

DETAILED DESCRIPTION

Figure 4:
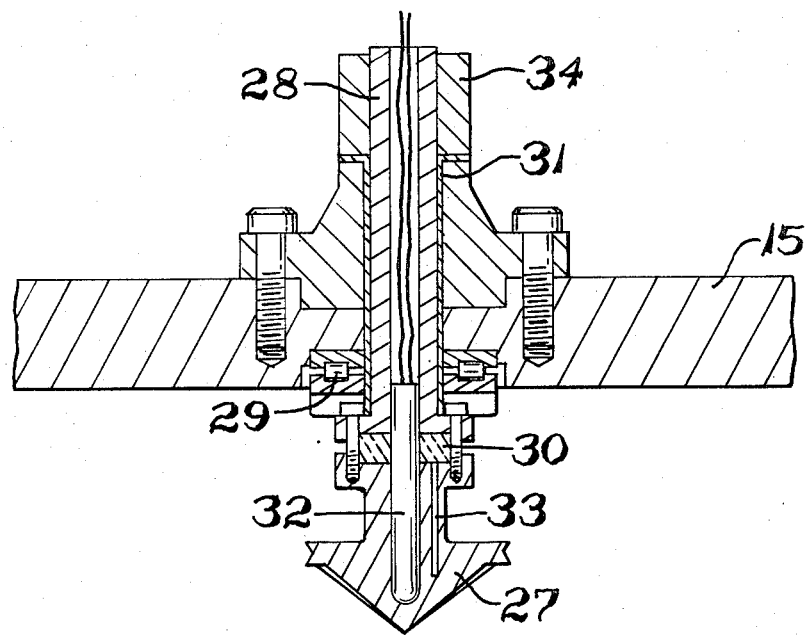
FIG. 4 is an enlarged view, partially in section and partially in side elevation, of the mounting for the upper portion of the specimen-engaging part of the apparatus.

The presently preferred embodiment of the invention is illustrated in the drawings as comprising a generally rectangular frame of suitable structural members including a base 10, vertical columns 11, and top members 12. Intermediate the base 10 and top members 12 is an intermediate apertured shelf or table 13. Extending vertically upwardly from the table 13 are four vertical guide posts 14 the upper ends of which are connected to and support a shelf 15. A plate 16 is slidably guided upon posts 14. The plate 16 is adapted to be vertically moved by virtue of a connection to the piston rod 17 attached to a piston 18 in a fluid-pressure cylinder 19 provided with fluid pressure inlet and exhaust parts 20 and 21. The cylinder 19 is suitably mounted upon the base 10.

Figure 5:
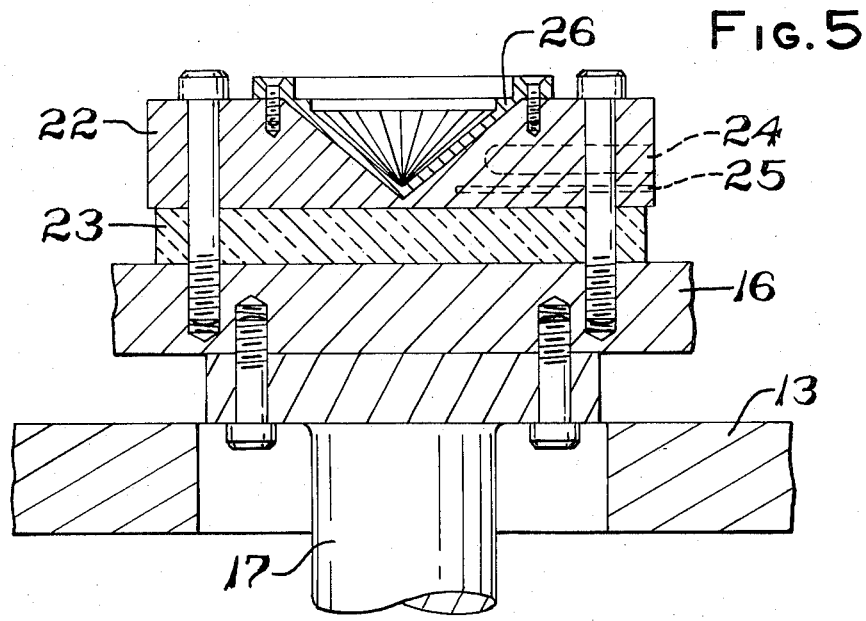
FIG. 5 is an enlarged view, partially in section and partially in side elevation, of the lower portion of the specimen-engaging part of the apparatus.

Referring now to FIG. 5, it will be seen that the plate 16 is bolted to the flanged end of piston rod 17 and that a specimen stator plate 22 is bolted to the top of plate 16 with a pad 23 of insulating material therebetween. The specimen stator plate 22 is formed of a good heat conductive material, such as aluminum, and is provided with a plurality of lateral cavities 24 for an electrical heating means and an additional lateral cavity for a temperature responsive device such as a thermocouple. The stator plate 22 is also provided on its upper surface with a generally conically shaped cavity in which a conically shaped specimen container 26 is removably secured. The specimen container has an upwardly facing conical cavity adapted to receive the specimen of elastomer to be tested. The inner surface of the specimen container may be provided with generally radially extending ridges and corrugations or may otherwise be provided with a suitable surface to prevent a specimen placed therein from rotating relative thereto.

In vertical alignment with the specimen container 26, the shelf 15 is provided with a vertically downwardly directed, generally conically shaped specimen rotor 27. The surface of the rotor may be provided with a plurality of radially extending ridges and grooves or other suitable pattern to prevent relative movement between the rotor and the surface of the specimen engaged thereby as hereinafter explained.

Referring to FIG. 4, it will be seen that the rotor 27 is removably connected to the lower end of a hollow shaft 28 which is rotatably supported in shelf 15 by suitable bearings 29. An insulating pad 30 is placed between the rotor 27 and the end of shaft 28 which is preferably supported in a bushing 31. A heating element 32 is positioned within the rotor 27 with the leads thereof extending through the bore of the shaft 28. A temperature sensor 33, such as a thermocouple, is also provided in the rotor.

The upper end of shaft 28 is non-rotatably connected to a radially extending arm 34 of the outer end of which is connected, through an adjustable connecting rod 35, to one end of an electrical strain gauge or load cell 36; see FIGS. 1–3. The other end of strain gauge 36 is connected to the piston rod 37 of a fluid pressure cylinder 38 provided with the usual inlet and exhaust ports, not shown. The cylinder 38 is suitably mounted upon a support carried on the frame of the apparatus with the piston rod slidable through the bracket 39 mounted on shelf 15. The piston rod 37 is threaded and provided on either side of the bracket 39 with nuts 40 and 41 for adjustably limiting the stroke of piston rod 37 and, hence, the arc of movement of the rotor 27.

A means for limiting the approach of the specimen holder, or stator 26, to the rotor 27 is provided by one or more adjustable stops carried by the shelf 15 and engageable with the plate 16. As here shown, this means is provided by a pair of vertically extending screws 42 threaded through plate 15 with their lower ends positioned to contact the plate 16. Each screw 42 is provided with a nut 43 to hold the screw in its adjusted position. A suitable distance measuring gauge 44 may also be provided upon shelf 15 and engageable by the plate 16 to indicate the relative positions of these parts and, hence, the proximity of the rotor 27 relative to the stator 26. This is desirable in order to provide a specimen cavity of predetermined dimensions between these members. The plate 16 may be provided with an adjustable stop 45 aligned with the operating plunger of gauge 44 to facilitate adjusting the zero reading of the latter.

The controls and indicating devices for the apparatus are preferably mounted on the front panel 46. The indicating devices include temperature indicators 47a and 47b for the stator and rotor and three digital indicators 48, 49 and 50 for indicating, respectively, the maximum torsional stress produced in the specimen, the time interval required for that stress to be reduced to a predetermined percentage of its maximum value, and the integral of the torsional stress in the specimen for a predetermined time. Centrally of the control panel is an off-on switch 51 and the manual-automatic selector switch 52. Each of the heating elements for the stator and rotor is provided with its individual off-on switch 53, 54 and temperature controllers 55, 56, respectively. Also provided upon the front panel 46 are two push button switches 57, 58, controlling movement of the stator 26 to specimen-engaging position, as well as push button switches 59, 60 for effecting return movement of the stator to the position shown in the drawings, which is the open position. Associated with the push buttons 57, 58 is an indicator light 61 and associated with the push buttons 59, 60 is an indicator light 62 to indicate, respectively, the operative condition of the circuits controlled by the push buttons.

Figure 7:
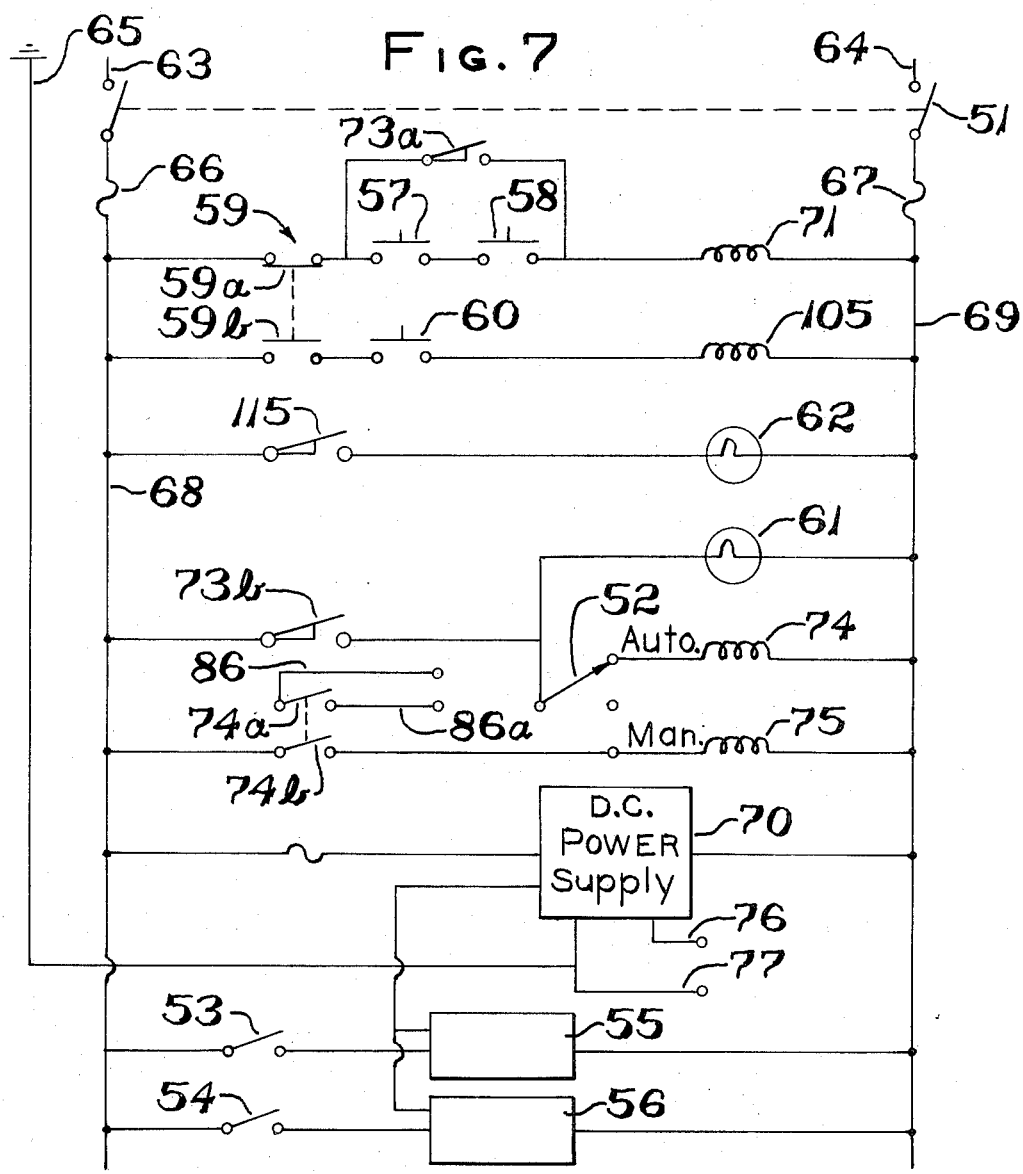
FIG. 7 is a schematic, cross-the-line wiring diagram of a portion of the electrical circuit for the apparatus illustrating the controls for temperature conditioning and deforming the specimen; and, FIG. 8 is a schematic wiring diagram of the instrumentation portion of the electrical circuit for the apparatus illustrating how the several numerical readings representative of the maximum stress of stress relaxation are obtained.
Figure 8:
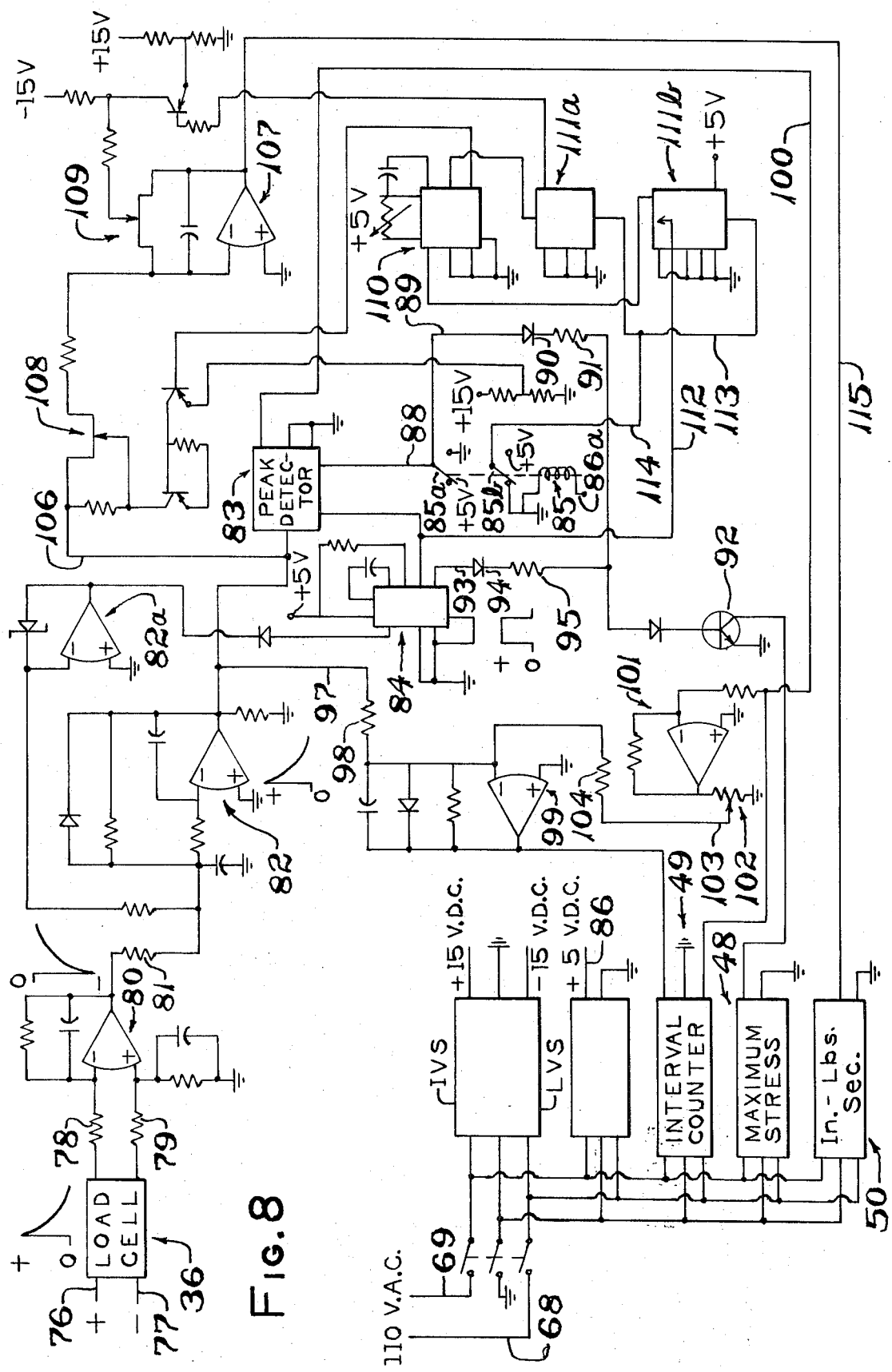

Referring now to FIGS. 7 and 8 of the drawings it will be seen that electrical power for the apparatus is supplied from a suitable source of 110–115 volt alternating current energy, indicated by power lines 63, 64 and ground wire 65. Control of supply of power to the apparatus is affected by the off-on switch 51, which in the "on" position supplies electrical energy through fuses 66, 67 to the power mains 68 and 69 of the apparatus. Heating energy is supplied to the heating elements in the stator 26 and the rotor 27 under control of the temperature controllers 55 and 56 upon closure of the switches 53 and 54. The actual temperature of the stator and rotor are indicated upon the temperature indicators 47a and 47b. Closing of switch 51 also supplies energy to a power supply unit 70 which provides suitable low voltage direct current power for the strain gauge or load cell 36, see also FIG. 8.

The dimensions of the stator 26 and rotor 27 are such that a specimen of 2 inches by 2 inches by one-quarter inch provides sufficient material to completely fill the space between the rotor and stator when these are in specimen engaging position with a small excess of the specimen extending beyond the confines of the cavity formed between the rotor and stator. The screws 42 are adjusted so that, when the specimen is engaged between the rotor and stator at the position of these parts as limited by screws 42 when the piston rod 18 is elevated, the specimen will be under a predetermined pressure.

The functioning of the apparatus to perform a test upon a specimen and the functioning of the indicating and control circuits for the apparatus will be better understood from the following description of a complete cycle of operation.

OPERATION

The off-on switch 51 is placed in the "on" position, and switch 52 is set for automatic operation. The temperature at which the specimen is to be tested is selected by appropriate setting of the temperature controllers 55 and 56 and actuating of the switches 53 and 54, if the test is to be other than at ambient temperature. When the temperature indicators 47a and 47b show that the predetermined temperature for the stator and rotor have been reached, the specimen is placed over the cavity in the stator 26 and the push buttons 57 and 58 are simultaneously operated. Two buttons are provided to require the operator to use both hands and thus prevent operation while the operator is positioning the specimen.

The closing of switches 57 and 58 energizes solenoid 71 of a conventional solenoid operated air valve to admit air under pressure into the lower part of cylinder 19 through port 21. This moves the piston 18 and the plate 16, with the stator 26 and the specimen placed thereon, upward until the plate 16 engages the screws 42. These screws have been preset such that, when the plate 16 is engaged, the specimen will be engaged by rotor 27 and will be firmly pressed into the cavity of stator 26 under a predetermined pressure. When this position is reached an adjustable stop 72, carried by plate 16, contacts and operates limit switch 73, see also FIG. 2. Actuation of switch 73 closes its contacts 73a and 73b. Closure of contact 73a provides a holding circuit about the switches 57 and 58 which may now be released and the solenoid 71 will remain energized to continue the supply of air under pressure to cylinder 19 thereby maintaining the stator 26 in specimen-engaging and pressure-applying relationship with the rotor 27. Closure of contacts 73b energizes light 61 thereby informing the operator that the push buttons 57 and 58 may be released.

The closure of contact 73b also supplies current through manual-automatic switch 52 energizing solenoid 74. Solenoid 74 is a settable time delay relay which is adjusted to provide a time delay in the order to 55 seconds to thereby permit the specimen engaged between the rotor 27 and stator 26 to attain the preselected temperature.

Figure 6:
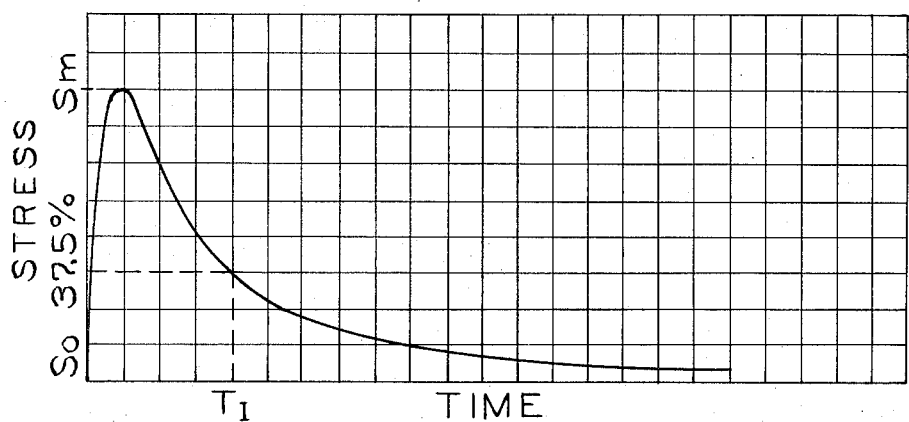
FIG. 6 is a typical graph of the stress in a specimen of elastomer which has been subjected to a predetermined momentary deformation by the illustrated apparatus.

When the predetermined time has elapsed, time delay relay 74 closes its contacts 74a and 74b. The closing of contact 74a completes a circuit to the indicating and recording circuit shown in FIG. 8 as hereinafter explained. The closing of contact 74b completes a circuit energizing the coil 75 of a pneumatic time delay which, after a predetermined time, in the order to 6 seconds, supplies an impulse of air under pressure to cylinder 38 thereby turning the rotor 27 a predetermined amount as preselected by the setting of nuts 40 and 41. Typically, the movement is 4° of arc and is effected such that the maximum torsional stress in the sample is produced in about 0.005 seconds and then begins to decay or relax in the manner illustrated in FIG. 6, which is a graphical representation of the torsional stress produced in a specimen of elastomer by the apparatus.

In view of the generally exponential nature of the stress relaxation it is preferable not to attempt to measure the time when complete relaxation has occurred but rather to measure the time for relaxation from maximum torsion stress to the point where it has been reduced to an amount that further relaxation is at a much slower rate. It will be seen from the shape of the curve in FIG. 6 that this occurs when the relaxation of the stress in the specimen is about two-thirds completed. It has been found, however, that measurement somewhat sooner provides equally reliable results while speeding the test. Hence, the point of measurement of time for relaxation is preferably chosen at the interval when the stress has relaxed to 37.5 percent of the maximum.

It has also been found that a very good indication of the processing characteristics of elastomers is provided by shape of the torsional stress-time curve, especially the portion from maximum to a region thereon attained within a very short interval of time as, for example, 2 seconds after the torsional impulse is applied to the specimen. Since the time interval required to effect maximum stress is only a small fraction of the interval, by integrating the area under the torsional stress-time curve and dividing by the maximum torsional stress a significant value is obtained which well characterizes the processibility of the elastomer. This value is especially important for those elastomers where the shape of the curve is such that the rate of change near the region of 37.5 percent of maximum is small and hence mechanical friction in the apparatus might cause significant errors in the time interval reading.

FIG. 8 is a simplified circuit diagram of the means for effecting the desired measurement of maximum torsional stress developed in the specimen, the time interval required for the stress to relax to 37.5 percent of the maximum, and the integral of the torsional stress-curve for a predetermined time of two seconds. Each of these values is separately, numerically displayed by a digital instrumentality.

The turning movement of the rotor 27, which rapidly torsionally stressed the specimen, and the subsequent relaxation of specimen stress are productive of forces acting upon the load cell 36 to produce a continuing electrical signal of form indicated adjacent thereto in FIG. 8. Preferably, the load cell 36 is of the electrical strain gauge type and is connected in the usual bridge circuit not shown. The power for the load cell is supplied from the D.C. power supply 70 (FIG. 7) over leads 76 and 77.

The signal from load cell 36 is fed through resistors 78 and 79 to an amplifier 80 which not only amplifies but also inverts the signal, as indicated schematically in FIG. 8 adjacent the output of the amplifier. The amplified signal then passes through resistance 81 to a second inverting amplifier 82 which, with its related resistances and capacitive components, serves as a low pass filter to prevent passage of transient voltage peaks. The wave form of the signal as it leaves this portion of the circuit is indicated in FIG. 8 adjacent to amplifier 82.

The signal next passes to the input of a peak detector 83, which is a known component readily available for this purpose. The peak detector 83 is controlled by an integrated circuit 84, which includes a multivibrator, and a relay 85. The input to the circuit 84 is through an inverting amplifier 82a while the relay 85 is energized through lead 86a, from a voltage supply LVS, which is connected to the solenoid lead 86a by the aforementioned movement of contact 74a (FIG. 7) to circuit closing position. Hence, relay 85 was energized simultaneously with the energization of the coil 75 of the pneumatic time delay so that relay 85 closed its contacts 85a and 85b about 6 seconds before the impulse of air pressure was supplied for turning movement of the rotor 27.

This prepared the peak detector 83 to store and hold the peak signal received from the amplifier 82. The presence of a positive signal from amplifier 82 prevents the signal from the multivibrator of the circuit 84 from affecting the peak detector for a time interval determined by the capacitive and resistance characteristics of the circuit which are so chosen that this delay is in the order of 0.05 second. During this time, the signal from amplifier 82, indicative of the stress produced in the specimen, is fed uninterruptedly into the peak detector which stores the peak value of the signal until the relay 85 is subsequently deenergized. Approximately 0.05 second after the integrated circuit 84 was temporarily suppressed, it sends energy to the peak detector 83 in a manner which prevents any decay of the peak of the signal received from amplfiier 82 while that signal now decreases due to relaxation of the induced stress in the specimen.

The peak value stored in peak detector 83 is visually displayed upon a digital voltmeter 48 of known type. This voltmeter, which may be one known as Model 200-4 marketed by Newport Laboratories, Santa Ana, California, is capable of displaying numbers of five digits. The signal for operating the digital voltmeter 48 is supplied from the peak detector 83 through leads 88, 89, CR 90, resistance 91 and transistor 92. A connection is also supplied to the digital voltmeter from the integrated circuit 84 through lead 93, CR 94, and resistance 95 connected to transistor 92. The latter circuit acts in a similar manner to the peak detector, namely to enable the digital voltmeter to receive a positive going signal representative of the stress developed in the specimen an to hold the maximum value thereof.

Means are also provided to determine the time interval from the initial imposing of the torsional stress in the specimen and the point when the stress has been reduced to 37.5 percent of its maximum value. This time interval, which is typically in the range of 0.15 second to 1.50 second, is visually displayed in hundredths of seconds upon a five place digital electronic counter 49 which may be of the type known as Model 1131-A marketed by Atec, Inc., Houston, Texas.

In order to operate the time interval counter 49, the signal from amplifier 82, representative of the stress in the specimen, is applied to the counter through lead 97, resistance 98 and inverting amplifier 99. The function of the amplifier 99 is to compare the continuing signal from the load cell 36 with the preselected percentage stored peak value from peak detector 83 and which is fed through lead 100 to amplifier 101. The output of amplifier 101 is fed to a potentiometer 102 the movable contact 103 of which is connected through a resistance 104 to the input of amplifier 99. The contact 103 is set to provide the desired percentage of the total voltage drop which total is determined by the stored peak value received from the peak detector 83. In the preferred embodiment, the contact 103 is set to provide a voltage which is 37.5 percent of the peak. This is compared with the value of the continuing signal from the specimen as supplied by the amplifier 82. So long as the value of the signal supplied from amplifier 82 through lead 97 is less than that supplied from contact 103, the amplifier 99 functions to allow the counter 49 to operate. However, when the signals are equal, or the signal from contact 103 exceeds that from lead 97, the counter is stopped and displays in digital form the time interval in hundredths of seconds from the start of specimen deformation until the induced stress therein has relaxed to 37.5 percent of its maximum value. This, together with the value of the total torque recorded on the digital voltmeter 48, provides a good indication of the "nerve" and processibility of the elastomer.

The aforementioned shape factor or integral of the stress-time curve for a predetermined time, i.e., two minutes, is displayed upon a digital voltmeter 50 in inch pounds seconds. This is possible since the voltage output of amplifier 82 is such that 1.0 volt equals 100 inch pounds of torque. This output is supplied through lead 106 to amplifier 107 connected as an integrator. Start, stop and reset of integrator 107 is determined by selective operation of two field effect transistors 108 and 109 which are controlled by a monostable multivibrator 110 and two flip flops 111a and 111b.

It will be remembered that when the specimen cavity is in open position, relay 85 is deenergized. At this time the integrator is in the reset mode. Closing of that test cavity energizes relay 85, as previously described. This completes a circuit from integrated circuit 84 through lead 112 to flip flop 111b and thence through leads 113 and 114 to the now closed contact 85b. Flip flop 111a and, in turn, monostable multivibrator 110 are also energized. As the specimen is stressed by the turning movement of the rotor 27 the field effect transistor 108 becomes conductive while field effect transistor 109 is rendered non-conductive. This initiates operation of integrator 107. Hence, the digital voltmeter 50 is energized through lead 115 and registers the time-integral of the stress curve. At the end of the two seconds interval which is determined by the monostable multivibrator 110, the field effect transistor 108 is rendered non-conductive. This terminates operation of the digital voltmeter 50 which now displays a reading of the time integral of the specimen strain curve for a period of 2 seconds.

When the test is completed, the operator simultaneously operates push button switches 59 and 60. The operation of switch 59 opens its contact 59a and closes contact 59b. Opening of contact 59a interrupts the circuit to solenoid 71 thus terminating supply of air under pressure to the lower end of cylinder 19. The closing of contacts 59b and 60 energize solenoid 105 supplying air under pressure to the upper end of cylinder 19. Hence, the plate 16 with the stator 26 are lowered opening the specimen cavity. Also, fluid pressure is supplied to cylinder 39 to restore rotor 27 to its initial position.

As the plate 16 descends, limit switch 73 is disengaged extinguishing light 61 and deenergizing solenoid 74. This in turn opens contacts 74a and 74b deenergizing relay 85 so that it contacts 85a and 85b are restored to positions which effect resetting of the circuitry. This includes rendering conductive field effect transistor 109, restoring integrator 107 to zero potential, and resetting the digital voltmeters 48, 49, and 50. The push buttons 59 and 60 are held depressed until light 62 is illuminated as the result of plate 16 reaching its lower position where it operates a limit switch 115. If a new test is to be made it is now necessary only to position a sample in the stator 26 and simultaneously push buttons 57 and 58. When it is desired to discontinue testing for an extended time the switch 51 is actuated to "off" position thus deenergizing all electrical circuits of the apparatus.

The temperature selected for the stator and rotor will be chosen in accordance with the characteristics of the type of elastomer being tested. If the nature of the material is completely unknown it may be desirable to run several tests at different temperatures. This can be readily done since the entire time for test, including bringing the stator and rotor to proper temperature, is only a few minutes. Moreover, the results of the test are immediately displayed in numerical form so there is no need to make measurements upon a graph as has heretofore been required. Hence, the apparatus readily lends itself to use in a factory for production control as well as having the accuracy expected of a laboratory instrument.

Manual operation of the separate components of the apparatus, rather than the automatic cycle as just described, can be effected by placing switch 52 in the manual position. Also, a test circuit, not shown, can be provided with a multiple position switch to permit separate actuation of each major component of the instrumentation circuit.

Although the invention has been specifically described as it is incorporated in the presently preferred embodiment, it will be apparent that changes may be made without exceeding the ambit of the invention. Thus, suitable digital printers and digital limit controls can be used with or in substitution for the registry type voltmeters to provide an indication and/or record of materials that are not within preselected specifications. Also, the load cell 36 need not be located as shown but may be a suitable electrical strain gauge, responsive to torque, mounted directly on the shaft of the rotor 27. Moreover, cured elastomeric articles as well as uncured elastomeric specimens can be tested. For example, O-rings may be non-destructively tested by replacing the stator 26 and rotor 27 with cooperating plates of suitable configuration. The test can be run at room temperature, if desired, by placing switches 53 and 54 in the "off" position. These and other changes and adaptations of the apparatus which will readily occur to those skilled in the art are all deemed encompassed by the invention the scope of which if defined in the attached claims.

We claim:

1. An apparatus for determining a physical property of an elastomer comprising sample-engaging means including a pair of relatively movable members, means to move one of said members through a predetermined displacement relative to the other member while a sample of the elastomer to be tested is engaged between said members to thereby subject said sample to a predetermined strain, means to generate a continuing electrical signal representative of the induced stress of said sample resulting from said displacement and the relaxation of that stress, and electrical means responsive to said signal to digitally represent the integral of said signal for a predetermined time interval inclusive of the maximum of said stress.

2. An apparatus as defined in claim 1 and further including a means to digitally indicate the maximum stress produced in said sample.

3. An apparatus as defined in claim 1 wherein said electrical means includes a digital voltmeter, an integrator circuit connected between said voltmeter and said means to generate the electrical signal and means to render said integrator circuit operative for a predetermined time.

4. An apparatus as defined in claim 1 and further including means responsive to said signal to digitally represent the lapse of time required for the stress produced in said sample to decrease a predetermined percentage of its maximum value.

5. An apparatus as defined in claim 4 wherein the last-named means includes an electrical operated counter, means to start said counter when the sample is strained, and means to automatically stop the counter when the stress remaining in said sample after the latter has decreased to a predetermined percentage of the maximum value.

6. An apparatus as defined in claim 1 wherein said means to generate an electrical signal comprises an electrical strain gauge responsive to the torsional force applied to the specimen, and the means responsive to said signal comprises electrical circuit means to store the maximum signal received from said strain gauge, and means to indicate the said maximum signal.

7. An apparatus as defined in claim 1 wherein said electrical means comprises a load cell which produces an electrical signal responsive to the displacement of said movable member, means to detect the maximum value of the signal received from said load cell, means to detect when the signal from the load cell has decreased to a predetermined percentage of its maximum, and electrical timing means for measuring the time required for said decrease.

8. An apparatus as defined in claim 1 and further comprising means to heat said sample engaging members to a selected temperature.

9. An apparatus as defined in claim 1 wherein said pair of relatively movable members are mounted in alignment, and means are provided to move one of said members toward and away from the other member to selectively engage the sample between members under predetermined pressure and to thereafter release the sample.

10. An apparatus for determining a physical property of an elastomer comprising, sample-engaging means including a rotatable and nonrotatable member, means to move said rotatable member through a predetermined arc while a sample of the elastomer to be tested is engaged between said members to thereby subject said sample to a torsional stress, means to generate an electrical signal representative of the stress produced in said sample, and electrical means responsive to said signal to determine and digitally display the integral of said signal for a predetermined time interval inclusive of the maximum of said stress.

11. An apparatus as defined in claim 10 and further including means to digitally indicate the maximum stress produced in said sample.

12. An apparatus as defined in claim 10 wherein said electrical means further includes means responsive to said signal to digitally represent the lapse of time required for the stress produced in said sample to decrease a predetermined percentage of its maximum value.

13. An apparatus as defined in claim 12 wherein said electrical means includes an electrically operated counter, means to start said counter when the sample is initially subjected to the torsional stress, and means to automatically stop the counter when the stress remaining in said sample after the stressing has decreased to a predetermined percentage of the maximum value.

14. An apparatus as defined in claim 13 wherein the means to automatically stop the counter include means to detect the maximum stress produced in the sample, means responsive to said last-mentioned means providing a signal representative of a predetermimed percentage of said maximum stress, means comparing the last-mentioned signal with the signal representative of the stress remaining in said sample, and means to stop the counter when the signal representative of the stress remaining in the sample becomes less than the signal representative of a predetermined percentage of the maximum value of the stress.

15. An apparatus as defined in claim 14 and further comprising means to digitally indicate the maximum stress produced in the sample.

16. An apparatus as defined in claim 15 wherein the said maximum stress indicating means is a digital voltmeter operatively connected to the said means to detect the maximum stress produced in the sample.

17. An apparatus for determining a physical property of an elastomer comprising: a frame including a base and vertically extending support members connected at the top; a specimen-engaging member rotatably mounted upon the frame adjacent the top thereof with its specimen-engaging surface facing downwardly, a second specimen-engaging member having a specimen-engaging surface facing upwardly; vertically movable means mounted on the base of said frame with the movable portion thereof non-rotatably supporting said second specimen-engaging member in axial alignment with the first-mentioned spacimen-engaging member, means to control movement of said vertically movable means to stop said movement when the adjacent surfaces of the specimen-engaging members are a predetermined distance from each other to thereby grip therebetween a specimen of predetermined dimensions under predetermined pressure; means to rapidly arcuately move the first-mentioned specimen-engaging member a preselected amount and thereby create a stress in the specimen; means to provide a continuous electrical signal of the stress produced in said specimen; means to detect the maximum of said signal; electrical means to integrate said continuous signal for a predetermined time interval inclusive of the maximum of said stress; and means to separately digitally indicate the said maximum of said signal and the time integral thereof.

18. An apparatus as defined in claim 17 further including means to provide an electrical signal which is a predetermined percentage of said maximum signal; electrical means comprising the last-mentioned signal with the continuing signal representative of the stress in said specimen; electrical counter means; means to initiate operation of said counter means when the specimen is initially subjected to stress; and means to stop the counter when the signal representative of the stress remaining in the sample become less than the signal representative of a predetermined percentage of the maximum value of the stress.

19. An apparatus as defined in claim 18 wherein said specimen-engaging members are each electrically heated and means are provided to individually control the temperature of each of said member.

20. An apparatus as defined in claim 18 wherein one of said specimen-engaging members has a conically shaped cavity therein and the other of said members has a conically shaped projection axially aligned with said cavity.

* * * * *